United States Patent
Matuschek et al.

(10) Patent No.: US 12,377,580 B2
(45) Date of Patent: Aug. 5, 2025

(54) STRAND PELLETIZER AND METHOD FOR ADJUSTING THE CUTTING GAP OF SUCH A PELLETIZER

(71) Applicant: Coperion GmbH, Stuttgart (DE)

(72) Inventors: Martin Matuschek, Wiesbaden (DE); Stefan Wygas, Frankfurt (DE)

(73) Assignee: COPERION GMBH, Stuttgart (DE)

(*) Notice: Subject to any disclaimer, the term of this patent is extended or adjusted under 35 U.S.C. 154(b) by 768 days.

(21) Appl. No.: 17/426,060

(22) PCT Filed: Aug. 26, 2019

(86) PCT No.: PCT/EP2019/072696
§ 371 (c)(1),
(2) Date: Jul. 27, 2021

(87) PCT Pub. No.: WO2020/156690
PCT Pub. Date: Aug. 6, 2020

(65) Prior Publication Data
US 2022/0097260 A1    Mar. 31, 2022

(30) Foreign Application Priority Data
Jan. 29, 2019  (EP) .................................... 19154288

(51) Int. Cl.
*B29B 9/06* (2006.01)
*B01J 2/22* (2006.01)
(Continued)

(52) U.S. Cl.
CPC .................................... *B29B 9/06* (2013.01); *B01J 2/22* (2013.01); *B02C 18/144* (2013.01);
(Continued)

(58) Field of Classification Search
CPC . B29B 9/06; B01J 2/22; B02C 18/144; B02C 18/148; B02C 18/2283;
(Continued)

(56) References Cited

U.S. PATENT DOCUMENTS 4,533,282 A * 8/1985 Lindlar ................. B23C 5/2269
407/41
2008/0232910 A1* 9/2008 Hecht ....................... B23C 5/24
407/104

(Continued)

FOREIGN PATENT DOCUMENTS

CN      202701986 U     1/2013
CN      204622144 U     9/2015
(Continued)

OTHER PUBLICATIONS

English translation of WO-2010006572-A1 by EPO. (Year: 2010).*
(Continued)

*Primary Examiner* — Xiao S Zhao
*Assistant Examiner* — Inja Song
(74) *Attorney, Agent, or Firm* — DINSMORE & SHOHL LLP

(57) ABSTRACT

A strand pelletizer for pelletizing a strand of material comprises at least one cutting edge and an opposite cutting edge. The opposite cutting edge is arranged on a base body which is displaceable relative to a support body. The base body is independently displaceable in a linear manner relative to the support body and pivotable about at least one pivot axis. The strand pelletizer enables simple and precise adjustment of the opposite cutting edge and an associated cutting gap.

10 Claims, 7 Drawing Sheets

(51) Int. Cl.
- *B02C 18/14* (2006.01)
- *B02C 18/18* (2006.01)
- *B02C 18/22* (2006.01)
- *B29C 48/00* (2019.01)
- *B29C 48/05* (2019.01)

(52) U.S. Cl.
CPC ........ *B02C 18/148* (2013.01); *B02C 18/2283* (2013.01); *B29C 48/0022* (2019.02); *B29C 48/05* (2019.02); *B02C 2018/188* (2013.01)

(58) Field of Classification Search
CPC .......... B02C 2018/188; B29C 48/0022; B29C 48/05; B29C 48/06; B23C 5/2226; C23C 5/24; C23C 5/2472

See application file for complete search history.

(56) References Cited

U.S. PATENT DOCUMENTS

| | | | |
|---|---|---|---|
| 2009/0092451 A1* | 4/2009 | Harif | ........................ B23B 51/02 407/35 |
| 2012/0009030 A1* | 1/2012 | Oettle | ................. B23B 27/1614 407/103 |

FOREIGN PATENT DOCUMENTS

| | | |
|---|---|---|
| CN | 204700939 U | 10/2015 |
| DE | 3620015 A1 | 11/1986 |
| DE | 4411165 C1 | 12/1994 |
| DE | 10103827 A1 | 8/2002 |
| EP | 243732 A2 | 11/1987 |
| EP | 2296857 B1 | 11/2011 |
| JP | 2001062829 A | 3/2001 |
| WO | WO-2010006572 A1 * | 1/2010 ........... B02C 18/148 |

OTHER PUBLICATIONS

EP 19 154 288.5 Office Action dated May 20, 2021.
EP 19 154 2883.5 International Search Report dated Jul. 26, 2019.
Office Action for Chinese Patent Application No. 201980090714.7 mailed Feb. 8, 2023, 9 pages.

* cited by examiner

STRAND PELLETIZER AND METHOD FOR ADJUSTING THE CUTTING GAP OF SUCH A PELLETIZER

CROSS-REFERENCES TO RELATED APPLICATIONS

This application is a 35 USC 371 US National Stage Application of PCT/EP2019/072696 filed Aug. 26, 2019, which claims the priority benefit of European Patent Application EP 19 154 288.5 filed Jan. 29, 2019, the disclosures of which are hereby incorporated by reference herein as if fully set forth in their entirety.

The present patent application claims the priority of European patent application EP 19 154 288.5, the contents of which are incorporated herein by reference.

FIELD OF THE INVENTION

The invention relates to a strand pelletizer for pelletizing a strand of material. Furthermore, the invention relates to a method for adjusting a cutting gap of such a strand pelletizer.

BACKGROUND OF THE INVENTION

A strand pelletizer for pelletizing a strand of material is known from EP 2 296 857 B1. The strand pelletizer comprises a rotatable cutting rotor with a plurality of cutting edges and an opposite cutting edge, which together form a cutting gap. The opposite cutting edge is displaceable relative to the cutting rotor to adjust the cutting gap. The opposite cutting edge is moved by means of an adjustment screw.

SUMMARY OF THE INVENTION

The invention is based on an object of creating a strand pelletizer of simple design, which enables simple and exact adjustment of the cutting gap.

This object is achieved by a strand pelletizer for pelletizing a strand of material with
  at least one cutting edge,
  an opposite cutting edge, wherein
    the opposite cutting edge is arranged on a base body and
    the base body is displaceable relative to a support body for adjusting the opposite cutting edge,
  a feeding device for feeding a material strand into a cutting gap between the at least one cutting edge and the opposite cutting edge,
wherein the base body is linearly displaceable relative to the support body, and wherein the base body is pivotable relative to the support body about at least one pivot axis. Due to the fact that the base body is exclusively linearly displaceable relative to the support body and/or exclusively pivotable about at least one pivot axis, a distance of the opposite cutting edge to the at least one cutting edge and/or an angle of the opposite cutting edge relative to the at least one cutting edge is adjustable independently of each other. Thus, an adjustment of the angle of the opposite cutting edge relative to the at least one cutting edge is possible without adversely affecting the distance to the at least one cutting edge. Accordingly, an adjustment of the distance of the opposite cutting edge relative to the at least one cutting edge is possible without adversely affecting the angle of the counter cutting edge relative to the at least one cutting edge. Due to the substantially independent linear displacement and pivoting of the base body, a simple, fast and exact adjustment of the cutting gap is possible. The strand pelletizer in particular serves for pelletizing a plastic strand.

The at least one cutting edge is preferably formed on a cutting rotor that is rotatable about an axis of rotation. The cutting rotor comprises in particular a plurality of cutting teeth which form a respective cutting edge. In particular, the cutting rotor is rotatably mounted on a housing of the strand pelletizer. The cutting rotor can be driven in rotation about the axis of rotation by means of a drive.

The opposite cutting edge is preferably formed on a cutting bar. In particular, the cutting bar is attached to a cutting bar holder. Preferably, the cutting bar is connected to the cutting strip holder in a replaceable manner. The base body comprises in particular the cutting bar holder and the cutting bar arranged thereon.

The support body forms a support plane on which the base body can be linearly displaced and/or pivoted. The support body is preferably attached to a housing of the strand pelletizer. The axis of rotation of the cutting rotor runs in particular essentially parallel to the support plane. The base body is displaceable on the support plane in a linear manner, in particular such that the opposite cutting edge is displaced parallel to its starting position and thus the distance to the at least one blade is adjusted. In addition, the base body can be pivoted on the support plane in particular about a pivot axis running transversely, preferably perpendicularly, to the support plane in such a way that the angle between the at least one cutting edge and the opposite cutting edge is adjusted.

A strand pelletizer, in which the at least one pivot axis runs perpendicularly to a support plane of the support body, ensures a simple and exact adjustment of the cutting gap. Due to the fact that the at least one pivot axis is substantially perpendicular to the support plane, the angle of the base body and thus of the opposite cutting edge to the at least one cutting edge can be easily and precisely adjusted. Preferably, the base body can be pivoted relative to the support body about a first pivot axis and about a second pivot axis. The pivot axes preferably run parallel to one another. The pivot axes are spaced apart from one another along the opposite cutting edge. Preferably, the first pivot axis is formed in the region of a first end and the second pivot axis is formed in the region of a second end of the base body.

The strand pelletizer, in which the at least one pivot axis is formed by means of a respective pin on which the base body is pivotably mounted, ensures a simple structure and a simple and exact adjustment of the cutting gap. The respective pin is arranged in an associated recess of the base body. The recess is formed, for example, as a blind hole. The pin forms a fit with the recess in such a way that the pin can be pivoted relative to the base body and the pivot axis is formed, however, self-acting displacement along the pivot axis is avoided.

A strand pelletizer, in which the base body is linearly displaceable and/or pivotable on a support plane of the support body by means of at least one adjustment screw, ensures a simple and precise adjustment of the cutting gap. The at least one adjustment screw preferably comprises a fine thread. In particular, the fine thread has an adjustment accuracy of at least 0.002 mm/degree, in particular of at least 0.0015 mm/degree and in particular of at least 0.001 mm/degree. For example, the fine thread has an adjustment accuracy of 0.00139 mm/degree. In particular, the strand pelletizer comprises a first adjustment screw and a second adjustment screw. Preferably, the first adjustment screw is arranged in the region of a first end and the second adjustment screw is arranged in the region of a second end of the base body. In particular, the adjustment screws are arranged at a distance from one another along the opposite cutting edge. A respective central longitudinal axis of the at least one adjustment screw runs essentially parallel to a support plane of the support body. Preferably, a respective central longitudinal axis of the at least one adjustment screw runs transversely, in particular substantially perpendicularly, to the at least one pivot axis and/or to the opposite cutting edge. By actuating the adjustment screws in the same way, the base body and thus the opposite cutting edge can be linearly displaced in parallel so that a distance to the at least one cutting edge can be adjusted. By actuating only one of the adjustment screws, the base body and thus the opposite cutting edge can be pivoted about a pivot axis so that an angle between the at least one cutting edge and the opposite cutting edge can be adjusted.

A strand pelletizer comprising at least one adjustment screw arranged on the support body and connected to a respective pin mounted on the base body ensures a simple structure and a simple and exact adjustment of the cutting gap. The at least one adjustment screw is screwed into a threaded bore of the associated pin by means of a thread, in particular by means of a fine thread. A central longitudinal axis of the adjustment screw runs transversely, in particular perpendicularly, to a pin axis or a pivot axis formed by the pin. The pin is mounted on the base body so that the pin can be displaced linearly along the central longitudinal axis by turning the adjustment screw. The direction of displacement depends on the direction of rotation of the adjustment screw. Preferably, the strand pelletizer comprises a first adjustment screw and a second adjustment screw. The first adjustment screw is connected to a first pin, whereas the second adjustment screw is connected to a second pin. The pins are arranged at a distance from one another along the opposite cutting edge. Preferably, the first pin forms a first pivot axis, whereas the second pin forms a second pivot axis. By actuating the adjustment screws in the same way, the pins are linearly displaced in a synchronous manner with each other so that the opposite cutting edge is linearly displaced in parallel and a distance between the opposite cutting edge and the at least one cutting edge can be adjusted. If only the first adjustment screw is actuated, the first pin is linearly displaced and the base body is pivoted about the second pivot axis. Correspondingly, if only the second adjustment screw is actuated and the second pin is linearly displaced, the base body is pivoted about the first pivot axis. By actuating or turning only one adjustment screw, the angle between the opposite cutting edge and the at least one cutting edge can be adjusted.

A strand pelletizer, in which the at least one adjustment screw and the respective pin are pretensioned relative to one another by means of a respective spring element, ensures a simple and exact adjustment of the cutting gap. Due to the fact that the at least one adjustment screw and the respective associated pin are pretensioned by means of an associated spring element, a backlash of the threaded connection between the respective adjustment screw and the associated pin is eliminated on the one hand and a self-locking of the threaded connection is achieved on the other hand. The respective spring element is designed in particular as a coil spring.

A strand pelletizer, in which the at least one adjustment screw is pivotably mounted relative to the support body, ensures a simple and exact adjustment of the cutting gap. Due to the fact that the at least one adjustment screw is pivotably mounted relative to the support body, the at least one adjustment screw with its associated central longitudinal axis automatically adapts to an angular position of the opposite cutting edge. This avoids undesirable tensions and/or constraining forces that would impair the accuracy of the cutting gap adjustment. The respective central longitudinal axis of the at least one adjustment screw can thus be pivoted, in particular essentially parallel to the support plane.

A strand pelletizer, in which the at least one adjustment screw is mounted in a respective bushing arranged on the support body, ensures a simple and exact adjustment of the cutting gap. The respective bushing is fastened to the support body. An adjustment screw is mounted in the respective bushing in such a way that a central longitudinal axis of the adjustment screw can be pivoted. For this purpose, the adjustment screw forms a defined radial clearance with the bushing. The at least one adjustment screw thus forms a clearance fit with the associated bushing. For a ratio of an outer diameter d of the at least one adjustment screw to an inner diameter D of the associated bushing, in particular: $0.94 \leq d/D \leq 1.0$, in particular $0.95 \leq d/D \leq 0.99$, and in particular $0.96 \leq d/D \leq 0.98$.

A strand pelletizer, in which the respective spring element is arranged between the respective pin and a respective bushing fastened to the support body, ensures a simple structure and a simple and exact adjustment of the cutting gap. Due to the fact that the respective spring element acts between the associated pin and the associated bushing, on the one hand the adjustment screw mounted with a radial clearance in the bushing is pulled in the direction of the bushing so that the adjustment screw abuts against the bushing, and on the other hand a backlash of the threaded connection between the pin and the adjustment screw which is screwed therein is eliminated. In addition, self-locking of the threaded connection or the adjustment screw is achieved. Due to the radial clearance, the respective adjustment screw or the respective central longitudinal axis of the adjustment screw is pivotably mounted in the associated bushing so that the respective adjustment screw with its central longitudinal axis automatically adapts to an angular position of the opposite cutting edge.

A strand pelletizer comprising a first adjustment screw and a first pin which forms a first pivot axis and is displaceable by means of the first adjustment screw, and comprising a second adjustment screw and a second pin which forms a second pivot axis and is displaceable by means of the second adjustment screw, ensures a simple and precise adjustment of the cutting gap. The first adjustment screw is screwed into a threaded bore of the first pin by means of a thread, in particular a fine thread. Correspondingly, the second adjustment screw is screwed into a threaded bore of the second pin by means of a thread, in particular a fine thread. A first central longitudinal axis of the first adjustment screw runs substantially perpendicularly to the first pivot axis. A second central longitudinal axis of the second adjustment screw runs substantially perpendicularly to the second pivot axis. The pins or pivot axes are arranged at a distance to one another along the opposite cutting edge. By actuating or turning the adjustment screws in the same way, the pins are displaced linearly in a synchronous manner so that the opposite cutting edge is displaced in parallel and a distance between the opposite cutting edge and the at least one cutting edge can be adjusted. If, on the other hand, only one adjustment screw is actuated or turned, the base body or the opposite cutting edge is pivoted about the pivot axis of the spaced pin so that an angle between the opposite cutting edge and the at least one cutting edge can be adjusted.

A strand pelletizer comprising at least one fixing unit for fixing the base body and the support body to each other ensures a simple and exact adjustment of the cutting gap. The at least one fixing unit serves to fix the base body and the support body relative to each other when the base body is in a position in which the opposite cutting edge is adjusted in a desired manner relative to the at least one cutting edge. Preferably, the strand pelletizer has a plurality of fixing units that fix the base body along the opposite cutting edge to the support body. The at least one fixing unit is configured in such a way that a contact pressure force can be generated that presses the base body against a support plane of the support body. Preferably, the at least one fixing unit has a respective fixing screw and an associated fixing nut. The respective fixing nut is arranged in an associated groove and is displaceable along the latter. The respective groove is formed in the support body. The respective groove is bounded on a side facing the fixing screw by stops against which the fixing nut is pulled and pressed in a fixed state by means of the fixing screw. The respective groove runs in particular in parallel to the support plane and/or substantially in parallel to a central longitudinal axis of at least one adjustment screw. The at least one fixing unit generates substantially exclusively a contact pressure force acting on the base body, which is directed perpendicularly to the support plane. This does not affect the adjustment of the opposite cutting edge.

The invention is also based on an object of creating a method for simple and precise adjustment of the cutting gap.

This object is achieved by a method for adjusting a cutting gap of a strand pelletizer comprising the steps of:
providing a strand pelletizer according to the invention,
linearly displacing the base body relative to the support body and/or pivoting of the base body relative to the support body about at least one pivot axis for adjusting the cutting gap.

The method can in particular also be designed further with the features of a strand pelletizer according to the invention.

BRIEF DESCRIPTION OF THE DRAWINGS

Further features, advantages and details of the invention will be apparent from the following description of an embodiment, in which.

DESCRIPTION OF THE PREFERRED EMBODIMENT

Figure 1:
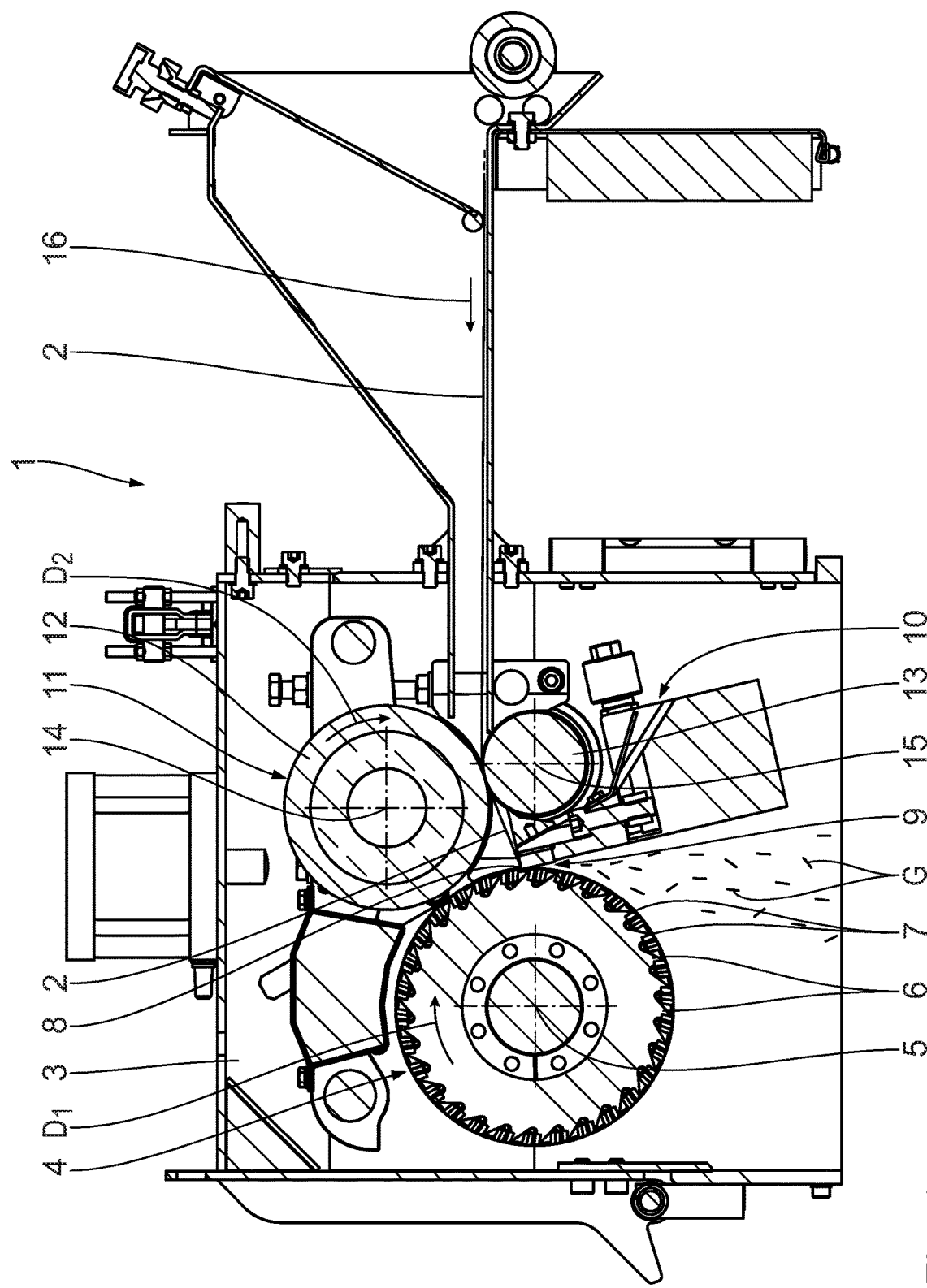
FIG. 1 shows a schematic side view of a strand pelletizer for pelletizing a strand of material in a cutting gap formed by a cutting rotor and an opposite cutting edge.
Figure 2:
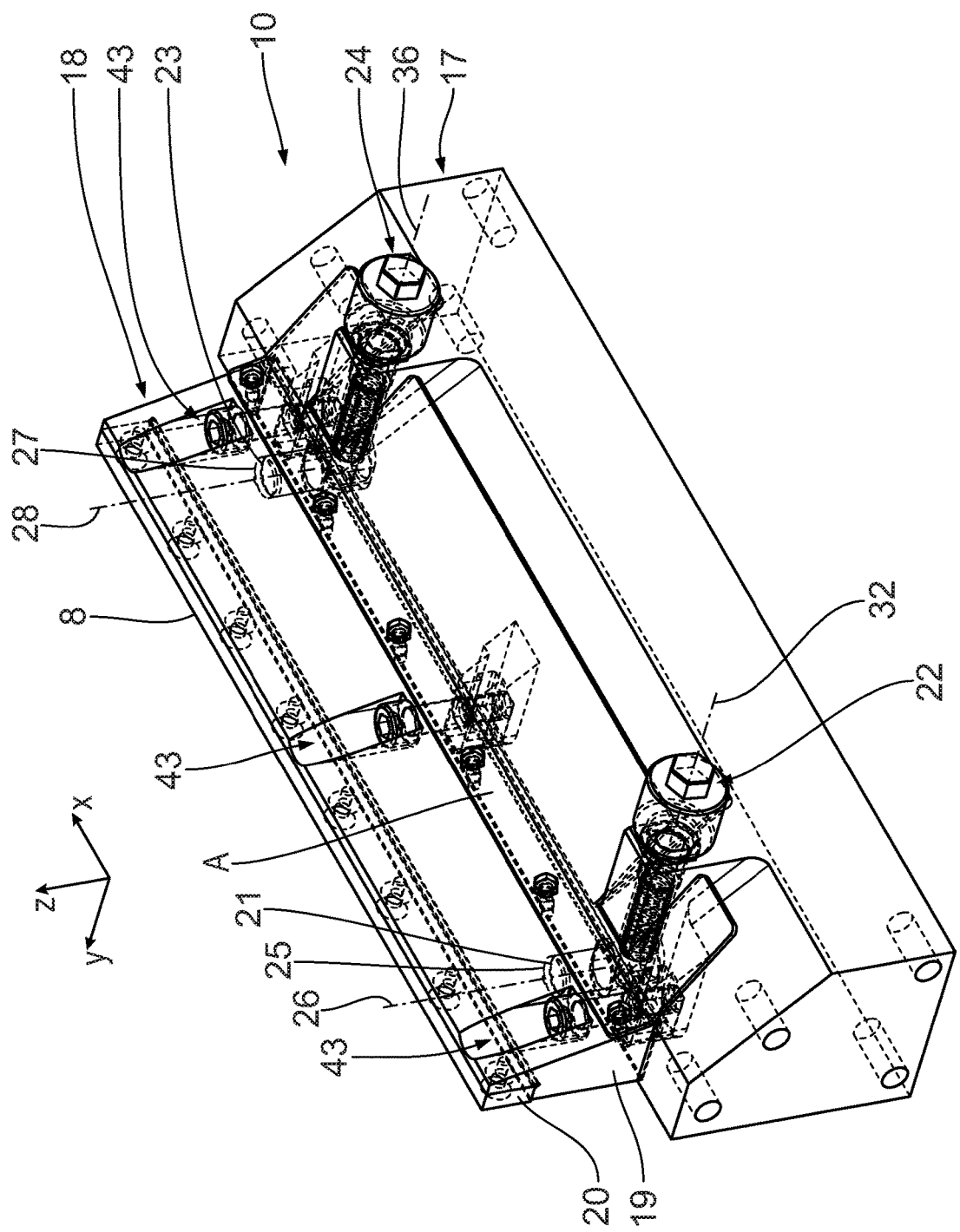
FIG. 2 shows a perspective view of an adjustment device for adjusting the opposite cutting edge and the associated cutting gap.
Figure 3:
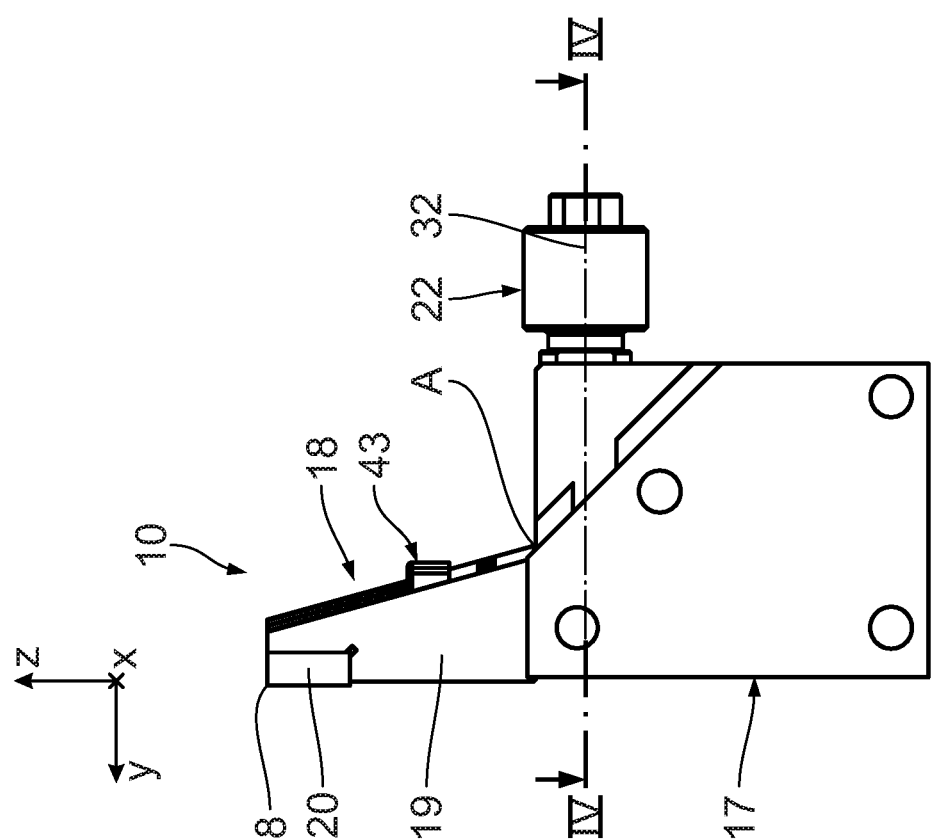
FIG. 3 shows a first side view of the adjustment device.
Figure 4:
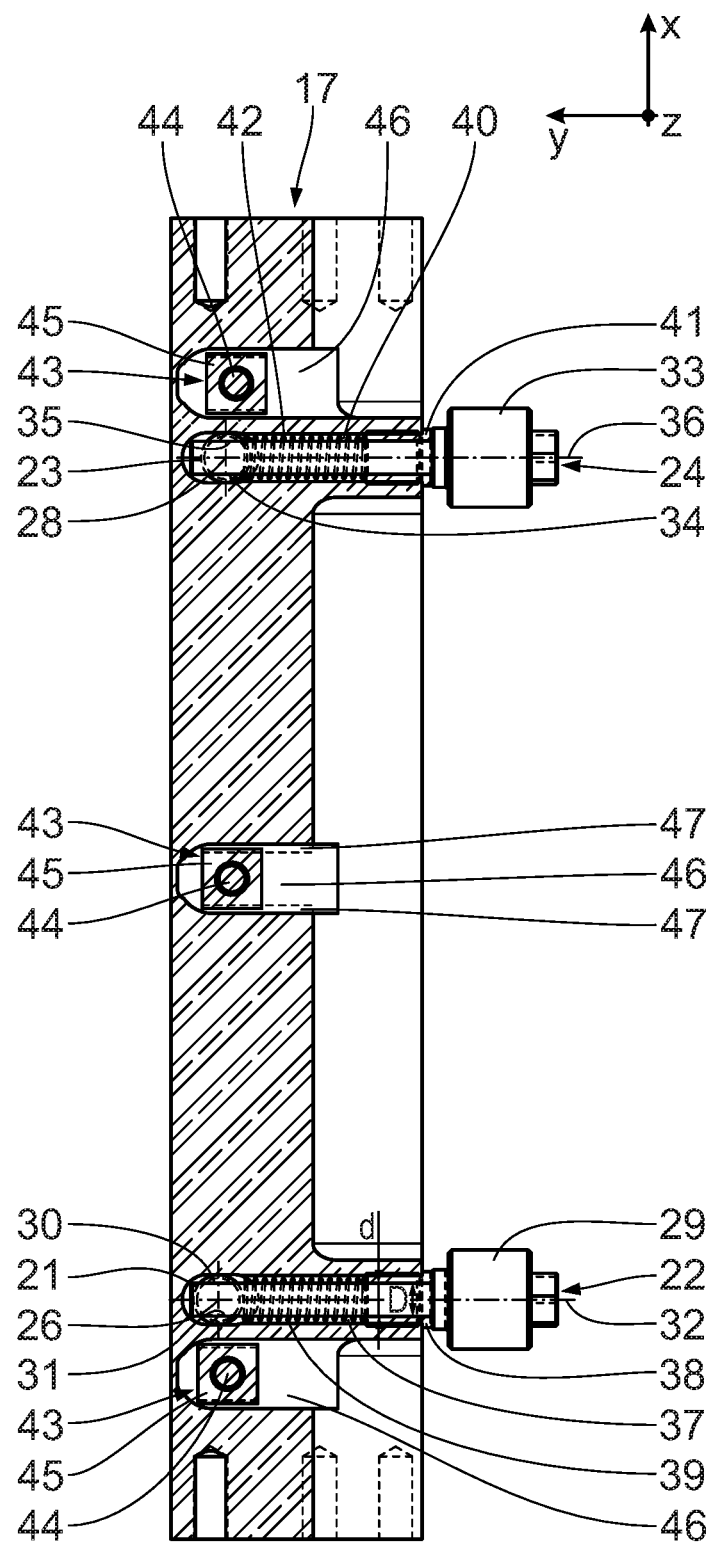
FIG. 4 shows a first section through the adjustment device along the section line IV-IV in FIG. 3.
Figure 5:
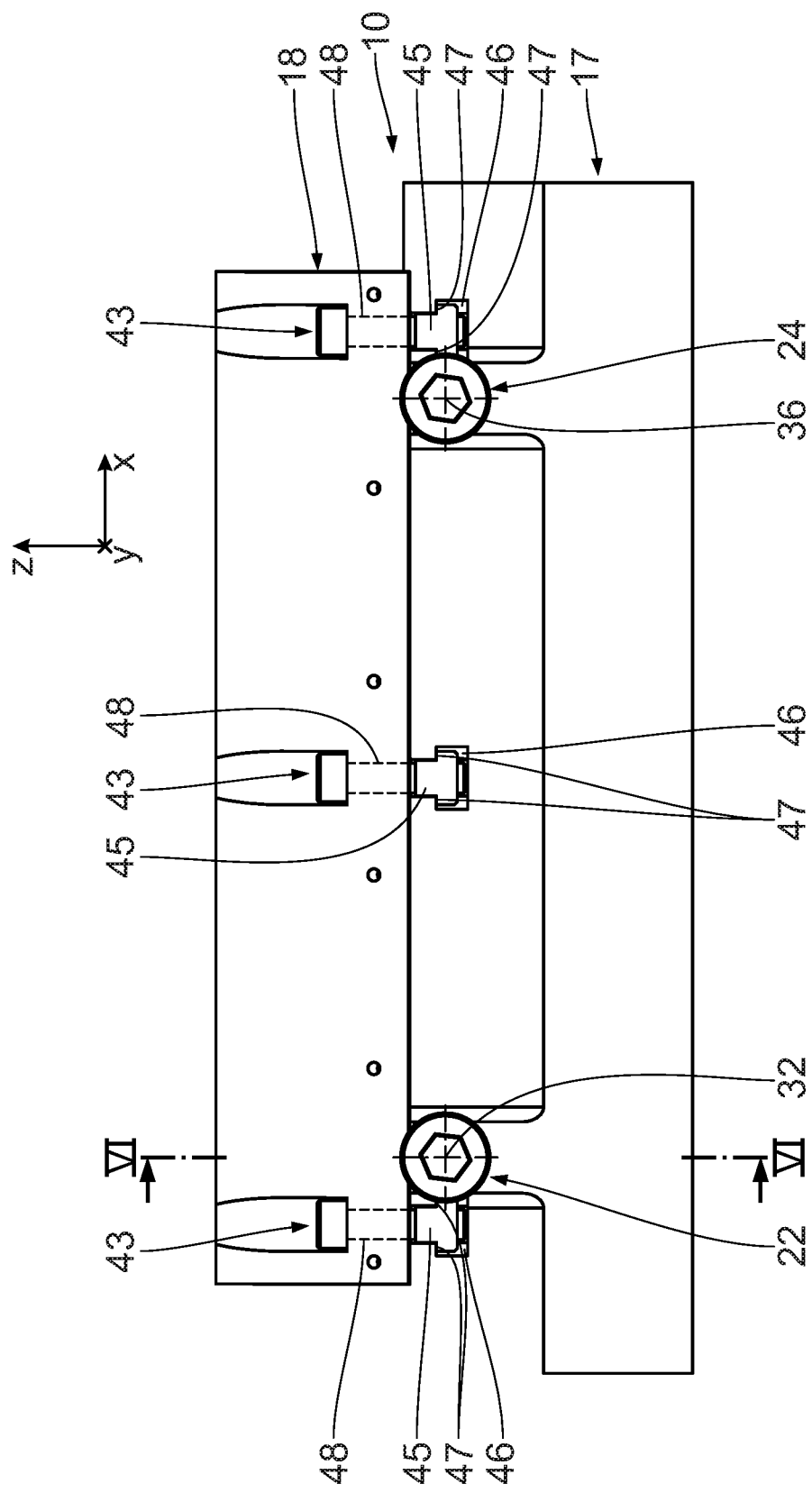
FIG. 5 shows a second side view of the adjustment device.
Figure 6:
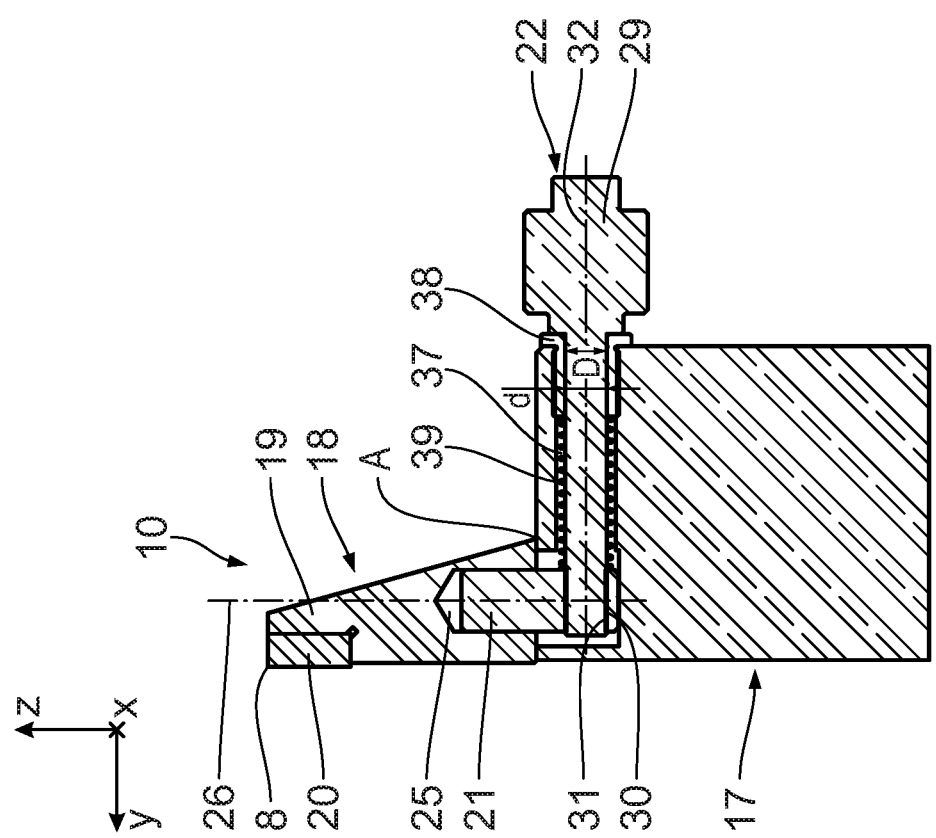
FIG. 6 shows a second section through the adjustment device along the section line VI-VI in FIG. 5.

The strand pelletizer 1 shown in FIG. 1 serves for pelletizing a material strand 2. The material strand 2 is, for example, a plastic strand. The strand pelletizer 1 comprises a housing 3, on which a cutting rotor 4 is rotatably mounted about an axis of rotation 5. The cutting rotor 4 is cylindrical in shape and has a plurality of cutting teeth 6 around its circumference. The cutting teeth 6 form a respective cutting edge 7 at the end. The cutting rotor 4 can be driven in rotation about the axis of rotation 5 in a direction of rotation $D_1$ by means of a drive not shown in more detail.

Figure 7:
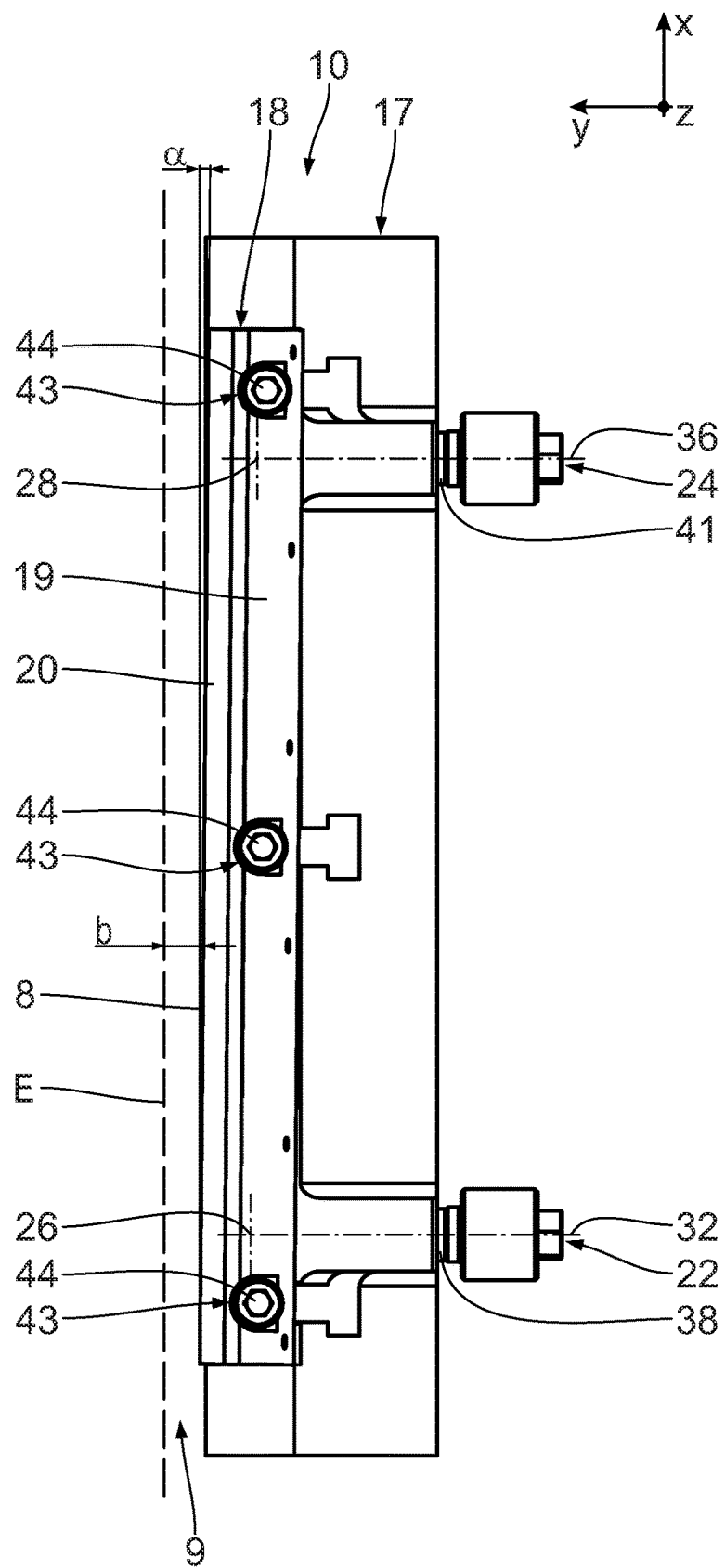
FIG. 7 shows a top view of the adjustment device.

The cutting edges 7 and an opposite cutting edge 8 define a cutting gap 9 between them. The opposite cutting edge 8 can be displaced relative to the cutting edges 7 by means of an adjustment device 10. The cutting edges 7 define a cutting plane E. The cutting plane E runs in parallel to an x-direction and a z-direction and perpendicularly to a y-direction. The x-, the y- and the z-direction each run perpendicularly to each other and form a Cartesian coordinate system. In order to adjust the cutting gap 9, the opposite cutting edge 8 can be linearly displaced and/or pivoted relative to the cutting plane E. The cutting plane E, the opposite cutting edge 8 and the cutting gap 9 are illustrated in FIG. 7. The cutting gap 9 is shown oversized in FIG. 7 for the purpose of illustration.

The strand pelletizer 1 comprises a feeding device 11 for feeding the material strand 2 into the cutting gap 9. The feeding device 11 comprises two conveying rollers 12, 13, which are rotatably mounted on the housing 3 about associated axes of rotation 14, 15. The feeding roller 12 can be driven in rotation about the axis of rotation 14 in a direction of rotation D2 by means of a drive not shown in greater detail so that the material strand 2 can be fed to the cutting gap 9 in a feeding direction 16.

The adjustment device 10 comprises a support body 17, which is fastened to the housing 3. The support body 17 forms a support plane A. A base body 18 is arranged on the support plane A. The base body 18 comprises a cutting bar holder 19 and a cutting bar 20 attached thereto in a replaceable manner. The cutting bar 20 forms the opposite cutting edge 8 so that the opposite cutting edge 8 is arranged on the base body 18.

The adjustment device 10 comprises a first pin 21 and an associated first adjustment screw 22 as well as a second pin 23 and an associated second adjustment screw 24. The first pin 21 is pivotably mounted in a first recess 25 of the base body 18 or of the cutting bar holder 19 so that the first pin 21 forms a first pivot axis 26. Correspondingly, the second pin 23 is pivotably mounted in a second recess 27 of the base body 18 or of the cutting bar holder 19 so that the second pin 23 forms a second pivot axis 28. The pivot axes 26, 28 are arranged at a distance from one another in the x-direction, i.e. along the opposite cutting edge 8. The swivel axes 26, 28 run essentially perpendicularly to the support plane A and in parallel to the cutting plane E or the z-direction.

The first adjustment screw 22 comprises a screw head 29 and a fine thread 30. The fine thread 30 is screwed into a threaded bore 31 of the first pin 21. A central longitudinal axis 32 of the first adjustment screw 22 runs substantially perpendicularly to the first pivot axis 26. Accordingly, the second adjustment screw 24 comprises a screw head 33 and a fine thread 34. The fine thread 34 is screwed into a threaded bore 35 of the second pin 23. A second central longitudinal axis 36 of the second adjustment screw 24 runs substantially perpendicularly to the second pivot axis 28.

The first adjustment screw 22 is arranged in the region of the fine thread 30 in a first receiving bore 37 of the support body 17 and is mounted on the support body 17 by means of a first bushing 38. The first receiving bore 37 runs substantially in parallel to the support plane A and is open in the region of the first pin 21 in the direction of the support plane A. The first bushing 38 is screwed into the first receiving bore 37 by means of a screw connection. A first spring element 39 is arranged in the first receiving bore 37 and is pretensioned between the first pin 21 and the first bushing 38. The first spring element 39 is designed as a helical spring through which the first adjustment screw 22 is guided. The screw head 29 abuts against the first bushing 38.

The second adjustment screw 24 is arranged in the area of the fine thread 34 in a second receiving bore 40 of the support body 17 and is mounted on the support body 17 by means of a second bushing 41. The second receiving bore 40 runs essentially in parallel to the support plane A and is open in the region of the second pin 23 in the direction of the support plane A. The second bushing 41 is screwed into the second receiving bore 40 by means of a screw connection. A second spring element 42 is arranged in the second receiving bore 40 and is pretensioned between the second pin 23 and the second bushing 41. The second spring element 42 is designed as a helical spring through which the second adjustment screw 24 is guided. The screw head 33 abuts against the second bushing 41.

In order to form a clearance fit or a radial clearance between the adjustment screws 22, 24 and the respective associated bushing 38, 41, the adjustment screws 22, 24 have an outer diameter d and the bushings 38, 41 have an inner diameter D, wherein: $0.94 \leq d/D \leq 1.0$, in particular $0.95 \leq d/D \leq 0.99$, and in particular $0.96 \leq d/D \leq 0.98$. The respective clearance fit allows the respective adjustment screw 22, 24 or the associated central longitudinal axes 32, 36 to pivot substantially in parallel to the support plane A.

The respective screw head 29, 33 is knurled for manual adjustment of the adjustment screws 22, 24. In addition, the respective screw head 29, 33 has a tool receptacle for interacting with a tool. The bushings 38, 41 are formed as flanged bushings. The bushings 38, 41 can have a sintered or plastic coating and/or have an additional thrust washer so that friction with the respective associated adjustment screw 22, 24 is minimized.

The adjustment screws 22, 24 can be actuated or turned in the same way and synchronously so that the base body 18 and thus the opposite cutting edge 8 can be displaced exclusively in a linear manner. The linear displacement takes place in the direction of the central longitudinal axes 32, 36 and preferably in the y-direction. By actuating or turning either the first adjustment screw 22 or the second adjustment screw 24, the base body 18 and thus the opposite cutting edge 8 can exclusively be pivoted, relative to the support body 17. When the first adjustment screw 22 is actuated, the base body 18 can be pivoted about the second pivot axis 28, whereas when the second adjustment screw 24 is actuated, the base body 18 can be pivoted about the first pivot axis 26.

For fixing the base body 18 on the support plane A of the support body 17, the strand pelletizer 1 comprises a plurality of fixing units 43. The fixing units 43 are arranged at a distance from one another in the x-direction. The fixing units 43 each comprise a fixing screw 44 and an associated fixing nut 45. For each of the fixing units 43, in the support body 17, a groove 46 is formed which runs in parallel to the y-direction and to the support plane A. The respective groove 46 is open in regions in the direction of the base body 18 so that the support body 17 forms stops 47 for the associated fixing screw 44 in the region of the respective groove 46. The respective fixing nut 45 is also referred to as a groove block.

For receiving the fixing screws 44, respective bores 48 are formed in the base body 18 or the cutting bar holder 19. By tightening the fixing screws 44, the fixing units 43 generate a contact pressure force which presses the base body 18 against the support body 17 and thus fixes it.

The mode of operation of the strand pelletizer 1 and the adjustment device 10 is described below:

In order to operate the strand pelletizer 1, the cutting gap 9 must be adjusted so that pellets G are produced from the material strand 2 in the desired manner. For this purpose, the opposite cutting edge 8 must be positioned and adjusted relative to the cutting plane E defined by the cutting edges 7. FIG. 7 illustrates an unadjusted opposite cutting edge 8, which has a distance b and an angle $\alpha$ to the cutting plane E. To adjust the opposite cutting edge 8, the fixing units 43 are loosened. For this purpose, the fixing screws 44 are loosened so that the base body 18 is no longer pressed against the support body 17.

Subsequently, the angle $\alpha$ is adjusted. In order to minimize the angle $\alpha$, the base body 18 must be pivoted around the first pivot axis 26. For this purpose, the second adjustment screw 24 is turned in such a way that the associated second pin 23 is displaced along the second central longitudinal axis 36 in the direction of the cutting plane E. When the base body 18 is pivoted about the first pivot axis 26, the position of the first pivot axis 26 and thus the distance of the first pivot axis 26 from the cutting plane E remains unchanged. The pivoting of the base body 18 thus takes place essentially independently of a linear displacement of the base body 18. The pivoting is terminated when the opposite cutting edge 8 essentially has an equal distance b from the cutting plane E along its length. Insofar as the adjustment screw 24 has to be adjusted asymmetrically to the adjustment screw 22 for this purpose, the central longitudinal axes 32, 36 automatically adapt to the angular position of the base body 18 due to the clearance fit between the adjustment screws 22, 24 and the associated bushings 38, 41. This avoids tensions and constraining forces that could impair the adjustment accuracy.

To adjust the distance b, the adjustment screws 22, 24 are then turned in the same way or in a synchronous manner so that the base body 18 and thus the opposite cutting edge 8 are displaced linearly in parallel to the starting position. By turning the adjustment screws 22, 24 together, the angle $\alpha$ or the adjusted angular position of the opposite cutting edge 8 does not change. The opposite cutting edge 8 is thus displaced exclusively in a linear manner in the direction of the central longitudinal axes 32, 36. The linear displacement thus takes place independently of any pivoting of the base body 18. This adjusts the distance b to a desired dimension.

Due to its design, the adjustment device 10 thus enables the opposite cutting edge 8 to be pivoted and/or moved linearly independently of one another. Hereby a simple and exact adjustment of the cutting gap 9 is achievable. Moreover, by pivoting about the first pivot axis 26 or about the second pivot axis 28, the cutting gap 9 can be adjusted independently of one another at the ends of the base body 18. The fixing units 43 are displaced together with the base body 18 so that in any position of the base body 18 the fixing units 43 generate a contact pressure force which is directed substantially perpendicularly to the support plane A.

Once the opposite cutting edge 8 or the cutting gap 9 is adjusted, the fixing units 43 are fixed. The pretensioning of the spring elements 39, 42 eliminates the backlash of the threaded connection between the adjustment screws 22, 24 and the pins 21, 23 and prevents an unwanted change of the cutting gap 9 when the fixing screws 44 are tightened. Subsequently, the pelletizing of the material strand 2 can be started. For this purpose, the material strand 2 is fed by means of the feeding device 11 in the conveying direction 16 to the opposite cutting edge 8 and into the cutting gap 9, where it is cut into pellets G by means of the cutting edges 7 interacting with the opposite cutting edge 8.

The invention claimed is:

1. A strand pelletizer for pelletizing a strand of material with
   at least one cutting edge,
   an opposite cutting edge, wherein
      the opposite cutting edge is arranged on a base body and
      the base body is linearly displaceable relative to a support body for adjusting the opposite cutting edge,
   a feeding device for feeding a material strand into a cutting gap between the at least one cutting edge and the opposite cutting edge,
   a first adjustment screw and a first pin which forms a first pivot axis and is displaceable by means of the first adjustment screw,
   a second adjustment screw and a second pin which forms a second pivot axis and is displaceable by means of the second adjustment screw,
wherein the first adjustment screw is arranged on the support body and is connected to the first pin which is mounted on the base body so that the base body is pivotable relative to the support body about the second pivot axis, and
wherein the second adjustment screw is arranged on the support body and is connected to the second pin which is mounted on the base body so that the base body is pivotable relative to the support body about the first pivot axis.

2. The strand pelletizer according to claim 1, wherein the respective pivot axis runs perpendicularly to a support plane of the support body.

3. The strand pelletizer according to claim 1, wherein the base body is pivotably mounted on the first pin and the second pin.

4. The strand pelletizer according to claim 1, wherein the base body is at least one of linearly displaceable and pivotable on a support plane of the support body by means of at least one of the first adjustment screw and the second adjustment screw.

5. The strand pelletizer according to claim 1, wherein the respective adjustment screw and the respective pin are pretensioned relative to one another by means of a respective spring element.

6. The strand pelletizer according to claim 1, wherein the respective adjustment screw is pivotably mounted relative to the support body.

7. The strand pelletizer according to claim 1, wherein the respective adjustment screw is mounted in a respective bushing arranged on the support body.

8. The strand pelletizer according to claim 5, wherein the respective spring element is arranged between the respective pin and a respective bushing fastened to the support body.

9. The strand pelletizer according to claim 1, comprising at least one fixing unit for fixing the base body and the support body to each other.

10. A method for adjusting a cutting gap of a strand pelletizer comprising the steps of:
   providing a strand pelletizer for pelletizing a strand of material with
      at least one cutting edge,
      an opposite cutting edge, wherein
         the opposite cutting edge is arranged on a base body and
         the base body is linearly displaceable relative to a support body for adjusting the opposite cutting edge, and
      a feeding device for feeding a material strand into a cutting gap between the at least one cutting edge and the opposite cutting edge,
      a first adjustment screw and a first pin which forms a first pivot axis and is displaceable by means of the first adjustment screw,
      a second adjustment screw and a second pin which forms a second pivot axis and is displaceable by means of the second adjustment screw,
   wherein the first adjustment screw is arranged on the support body and is connected to the first pin which is mounted on the base body so that the base body is pivotable relative to the support body about the second pivot axis, and
   wherein the second adjustment screw is arranged on the support body and is connected to the second pin which is mounted on the base body so that the base body is pivotable relative to the support body about the first pivot axis, and
   at least one of linearly displacing the base body relative to the support body and pivoting of the base body relative to the support body about at least one of the first pivot axis and the second pivot axis for adjusting the cutting gap.

* * * * *